United States Patent
Hensley

[11] Patent Number: 5,957,442
[45] Date of Patent: Sep. 28, 1999

[54] TURN SIGNAL SPRING

[76] Inventor: Ralph Hensley, P.O. Box 330, Owingsville, Ky. 40360

[21] Appl. No.: 08/629,739

[22] Filed: Apr. 9, 1996

[51] Int. Cl.[6] .......................................................... F16F 1/06
[52] U.S. Cl. ............................................ 267/180; 267/179
[58] Field of Search ...................................... 267/166, 178, 267/179, 180; 200/61.35

[56] References Cited

U.S. PATENT DOCUMENTS

| | | | |
|---|---|---|---|
| 1,854,056 | 4/1932 | Mott, Jr. .................................. | 200/61.35 |
| 1,971,134 | 8/1934 | Davis ........................................ | 367/160 |
| 2,209,780 | 7/1940 | Levine ................................. | 200/61.35 |
| 2,646,108 | 7/1953 | Norman ............................... | 267/180 X |
| 3,794,785 | 2/1974 | Tomlinson ........................ | 200/61.35 X |

*Primary Examiner*—Robert J. Oberleitner

[57] ABSTRACT

This invention relates to a device to cancel the turn signal of an automobile when it fails to cancel due to a defect in the turn signal switch or the turn signal canceling cam.

3 Claims, 1 Drawing Sheet

TURN SIGNAL SPRING

BACKGROUND OF INVENTION

The problem of some one driving an automobile with a flashing turn signal all the time is a very serious problem. The average driver and people crossing a street at an intersection will take for granted if the car's turn signal light is flashing that the car is going to make a turn but the driver intents to go straight ahead. A driver of an automobile at an intersection thinking the car is going to turn, could pull in front of the car with signal flashing that the car is going to make a turn.

The device that i have invented could prevent this.

SUMMARY OF THE INVENTION

This invention is a safety device to kick the turn signal handle back to neutral when the turn signal canceling cam or switch fails to operate correctly. I got the idea when the turn signal canceling cam on my automobile fail to cancel or return the turn signal handle to neutral after i would make a turn.

PREFERRED EMBODIMENT

Figure 1:
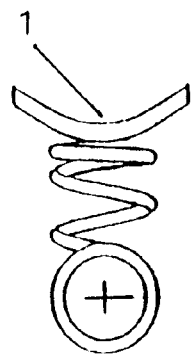
FIG. 1 is a view showing a coiled spring bonded to the center of the convex side of a piece of steel formed with a concave radius.

For the purposes of promoting an understanding of the principles of the invention, reference will now be made to the embodiment illustrated in the drawings.

Referring to FIG. 1 there is illustrated a coiled spring 2 with a concave nest 1 for the handle of the turn signal 4 to fit in. The concave radius 1 and the flexible coiled spring 2 will allow the concave nest 1 to go to the center of the handle 4 of the turn signal which will keep the handle 4 align with the coiled spring 2.

Figure 2:
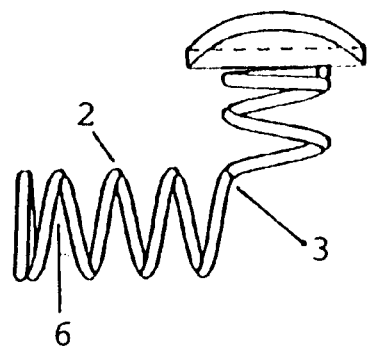
FIG. 2 is a view showing the coiled spring bend on a 90 degree angle bonded to the center of the convex side of the piece of steel.

FIG. 2 illustrates the coiled spring 2 bent on a 90 degree angle 3. The 90 degree angle 3 allows the concave radius 1 to extend outward to the handle 4, when positioned on the steering column housing 5. The thickness of the wall of the housing 5 will determine the pitch of the coiled spring 2. The opening of the coiled spring 6 is pressed on the wall of the housing 5 under the turn signal handle 4.

Figure 3:
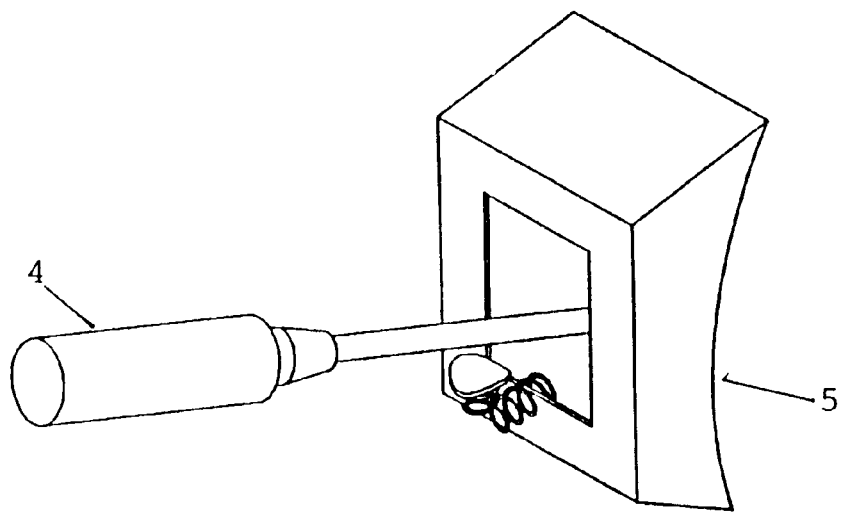
FIG. 3 is a perspective view showing the turn signal spring attached to the housing of the steering column of an automobile.

In FIG. 3 you will see how the coiled spring 2 fits under the turn signal handle 4. The opening of the coiled spring 6 is pressed on the wall of the housing of the steering column 5. When the driver of the automobile anticipate that a turn is going to be made, he or she puts pressure on the handle of the turn signal 4 which in turn puts pressure on the coiled spring 2 and causes the coiled spring 2 to compress. The compression of the spring 2 will keep the turn signal mechanism from locking. The driver of the automobile keeps pressure on the handle 4 with his hand till the turn is complete. After the turn is completed, the driver releases the pressure on the handle 4 which in turn releases the pressure on the compressed spring 2. When the pressure is release, the compressed spring 2 will move upward and push the handle 4 back to a neutral position. When the turn signal handle 4 is in neutral position the turn signal light will stop flashing.

I claim:

1. An apparatus for canceling a turn signal in a vehicle including a steering column and turn signal control stalk, comprising;

a resilient body in the form of a coil spring, said coil spring includes a bend intermediate first and second ends of the coil spring;

a first means adjacent one end of said coil spring for mounting to the steering column; and a second means at an opposite end of said coil spring for engaging said turn signal control stalk and resiliently biasing said turn signal control stalk to a neutral position so as to cancel a turn signal indication.

2. The apparatus as set forth in claim 1, wherein said bend is substantially 90°.

3. The apparatus as set forth in claim 1, wherein said means for engaging said turn signal control stalk is a concave nest.

* * * * *